(12) United States Patent  
Knight

(10) Patent No.: US 8,237,334 B2
(45) Date of Patent: Aug. 7, 2012

(54) PIEZO ACTUATOR

(75) Inventor: Steven Robert Knight, Killingworth, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 288 days.

(21) Appl. No.: 12/765,169

(22) Filed: Apr. 22, 2010

(65) Prior Publication Data

US 2010/0270890 A1 Oct. 28, 2010

Related U.S. Application Data

(60) Provisional application No. 61/171,537, filed on Apr. 22, 2009.

(51) Int. Cl.
*H01L 41/09* (2006.01)
(52) U.S. Cl. .......................................... 310/328
(58) Field of Classification Search .................. 310/328
See application file for complete search history.

(56) References Cited

U.S. PATENT DOCUMENTS

| | | | |
|---|---|---|---|
| 4,554,414 A | 11/1985 | House | |
| 6,563,254 B2 | 5/2003 | Perkins et al. | |
| D493,417 S | 7/2004 | Moler et al. | |
| 6,781,290 B2 | 8/2004 | Kurihara et al. | |
| 6,836,056 B2 | 12/2004 | Oudshoorn et al. | |
| 6,987,348 B2 | 1/2006 | Buhler et al. | |
| 7,038,356 B2 | 5/2006 | Athanas | |
| 7,132,781 B2 | 11/2006 | Moler et al. | |
| 7,141,915 B2 | 11/2006 | Takeuchi et al. | |
| 7,148,608 B2 | 12/2006 | Baumgartner et al. | |
| 7,271,524 B2 | 9/2007 | Sugg | |
| 7,348,711 B2 | 3/2008 | Ikeda et al. | |
| 7,352,113 B2 | 4/2008 | Nagaya et al. | |
| 7,405,509 B2* | 7/2008 | Ohashi et al. ............... | 310/328 |
| 2001/0004181 A1* | 6/2001 | Jaenker ..................... | 310/328 |
| 2005/0231077 A1 | 10/2005 | Moler et al. | |
| 2006/0023912 A1 | 2/2006 | Mazarakis | |
| 2007/0226974 A1 | 10/2007 | Li | |

FOREIGN PATENT DOCUMENTS

| | | |
|---|---|---|
| JP | 63-016800 | 1/1988 |
| JP | 03-175744 | 7/1991 |
| JP | 06-141398 | 5/1994 |
| JP | 10-117397 | 5/1998 |
| JP | 2003-134593 | 5/2003 |
| JP | 2006-084502 | 3/2006 |
| JP | 2007-180798 | 7/2007 |
| JP | 2000-152385 | 4/2010 |
| WO | 2004090999 A1 | 10/2004 |
| WO | 2008018099 A1 | 2/2008 |

* cited by examiner

*Primary Examiner* — Thomas Dougherty
(74) *Attorney, Agent, or Firm* — Robert J. Clark

(57) ABSTRACT

A transducer mechanism has a stacked piezo electric actuators driving arms rotating in different directions and having a structure such that the arms remain generally parallel to each other. A flexible member may be attached to the arms to obtain an extended stroke in a direction perpendicular to the axis of movement of the actuators.

15 Claims, 4 Drawing Sheets

PIEZO ACTUATOR

CROSS REFERENCE TO RELATED APPLICATIONS

The present application claims the benefit of the filing date of U.S. Provisional Patent Application Ser. No. 61/171,537, filed Apr. 22, 2009, the disclosure of which is incorporated herein by reference in its entirety.

TECHNICAL FIELD

The present invention relates, in general, to a piezo actuator, and in particular to a multi-piezo driven actuator driving arms rotating in different directions and having a structure such that the arms remain generally parallel to each other and a further embodiment utilizing a flexible member to obtain an extended stroke.

BACKGROUND

The benefits of piezoelectric actuators include high force and low power consumption while the limitations include the small displacement of the actuator. Attempts have been made to amplify the available displacement by using specialized structures. One such attempt is shown in co-owned U.S. Pat. No. 6,927,528, which discloses a piezoelectric movement amplifier arranged as a support having a rigid non-flexing portion, first and second arm portions extending rearward from the rigid portion, a pair of opposing surfaces with one opposing surface on each pivotable arm portion for movement relative to one another, and a force transfer member operably positioned between the first and second pivotable arm portions. A piezoelectric element is operably engaged between the rigid non-flexing portion and the force transfer member to drive the force transfer member in movement along a fixed path causing at least one of the first and second pivotable arm portions to pivot in response to an electrical activation of the actuator. The amplification of the piezoelectric movement is generally about a factor of five.

Another attempt is shown in U.S. Pat. No. 6,927,528, which discloses a piezoelectric movement amplifier arranged as a flexible, elliptic shell having a pair of piezoactive rod elements arranged along the large axis of the shell. Actuation of the piezoactive rods causes deflection of the shell, the result of which results in an amplification of the movement of the shell along the small axis of the shell by a factor of five over the deflection of the piezoelectric rods.

SUMMARY

At least one embodiment of the invention provides a transducer mechanism comprising: a first support structure defining a first rigid non-flexing portion, a moveable first force transfer member, and a first smart material actuator positioned between the first rigid non-flexing portion and the first force transfer portion, and a first arm and a second arm; the first smart material actuator operable to move the first force transfer member in a manner moving the first and second movable arms with respect to the first rigid non-flexing portion; a second support structure defining a second rigid non-flexing portion, a moveable second force transfer member, a second smart material actuator positioned between the first rigid non-flexing portion and the second force transfer portion, a third moveable arm, and the second moveable arm shared with and connecting the second support structure with the first support structure; the second smart material actuator operable to move the second force transfer member in a manner moving the second and third movable arms with respect to the second rigid non-flexing portion; wherein the first and second actuator are operable to cause the first and third arms to move toward or away from each other in a generally parallel manner.

At least one embodiment of the invention provides a transducer mechanism comprising: at least two supports connected to each other by an intermediate arm, each support including: a rigid non-flexing portion, an arm portion extending from the rigid portion; a force transfer member operably positioned for moving the arm portion; an actuator operably engaged between the rigid portion and the force transfer member to drive the force transfer member relative to the rigid portion to move the arm portion in response to an electrical activation of the actuator; wherein the arms of each support are generally parallel to each other and remain generally parallel to each other when the actuators are electrically activated.

At least one embodiment of the invention provides a transducer mechanism comprising: a first and second support structure connected to each other by an intermediate arm; the first support structure defining a first rigid non-flexing portion, a moveable first force transfer member, and a first smart material actuator positioned between the first rigid non-flexing portion and the first force transfer portion, and a first arm; the first smart material actuator operable to move the first force transfer member in a manner moving the first arm and the intermediate arm with respect to the first rigid non-flexing portion; a second support structure defining a second rigid non-flexing portion, a moveable second force transfer member, a second smart material actuator positioned between the first rigid non-flexing portion and the second force transfer portion, and a second moveable arm; the second smart material actuator operable to move the second force transfer member in a manner moving the second arm and the intermediate arm with respect to the second rigid non-flexing portion; wherein the first and second actuator are operable to cause the first and second arms to move toward or away from each other in a generally parallel manner; and wherein the mechanism is supported generally at a midpoint of the intermediate arm.

BRIEF DESCRIPTION OF THE DRAWINGS

Embodiments of this invention will now be described in further detail with reference to the accompanying drawings, in which.

DETAILED DESCRIPTION OF THE DRAWING

Figure 1:
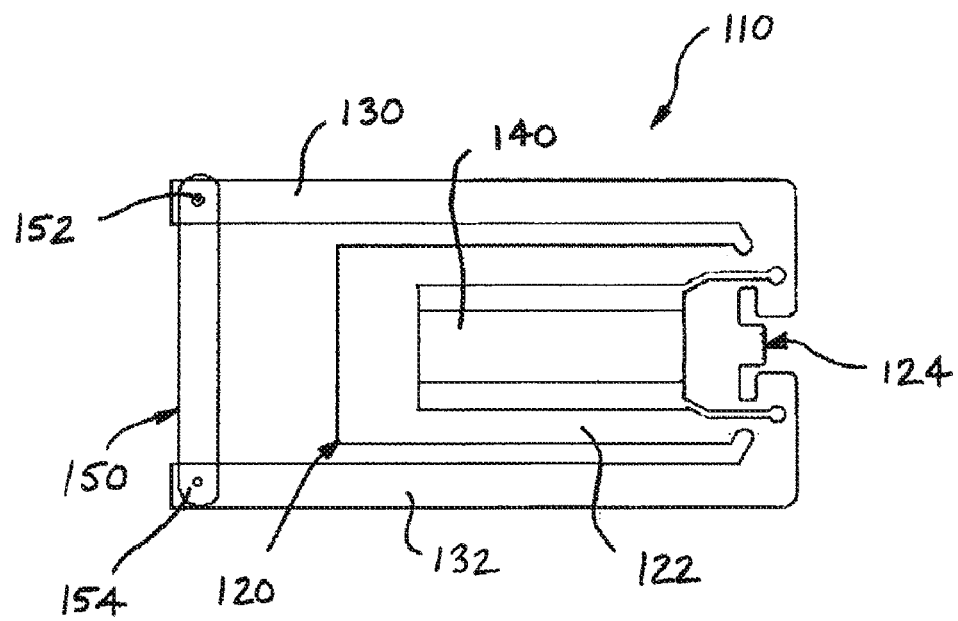
FIG. 1 is a front view of an embodiment of the piezo transducer of the present invention.
Figure 2:
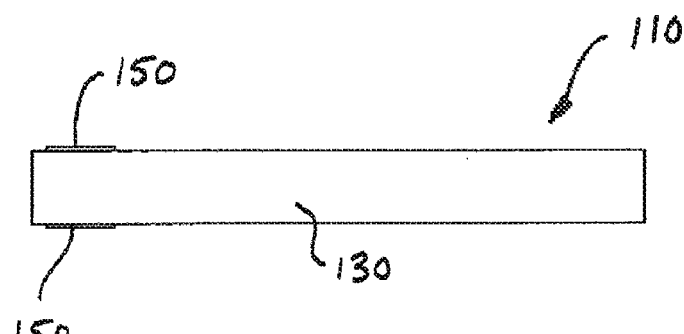
FIG. 2 is a top view of the piezo transducer of FIG. 1.
Figure 3:
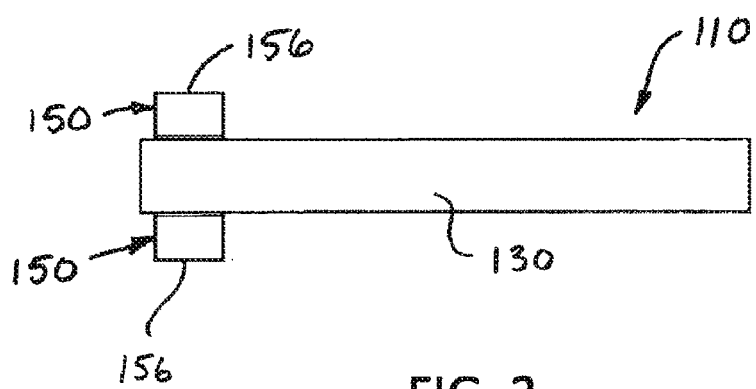
FIG. 3 is a top view of the piezo transducer of FIG. 1 shown in an actuated state.

Referring to FIG. 1, an embodiment of the transducer mechanism 110 is shown comprising a support 120 including: a rigid non-flexing portion 122, a first arm portion 130 extending from the rigid portion 122, and a force transfer member 124 operably positioned for driving the first arm portion 130 extending from the rigid portion in rotational movement relative to the support 120. An actuator 140 is operably engaged between the rigid portion 122 and the force transfer member 124 to drive the force transfer member 124 relative to the rigid portion 122 to move the first arm portion 130 in response to an electrical activation of the actuator 140. The mechanism 110 may include a second arm portion 132 as shown extending from the rigid portion 122, such that the second arm 132 rotates toward the first arm 130. Instead of an a second arm portion 132, the mechanism 110 may include a fixed base (not shown). The mechanism 110 also includes a flexible member 150 having a first portion 152 attached to the first arm portion 130 and a second portion 154, distal to the first portion 152, shown attached to the second arm portion 150. The flexible member 150 is shown on both sides of the mechanism 110 in an unflexed condition in FIG. 2 when the actuator is not actuated. When the mechanism 110 is actuated, the first arm 130 and the second arm 132 move toward each other. This movement shortens the attachment length of the flexible member causing a portion 156 of the flexible member 150 to bow in a direction perpendicular to the driving direction of the actuator 140 as shown in FIG. 3.

Figure 4:
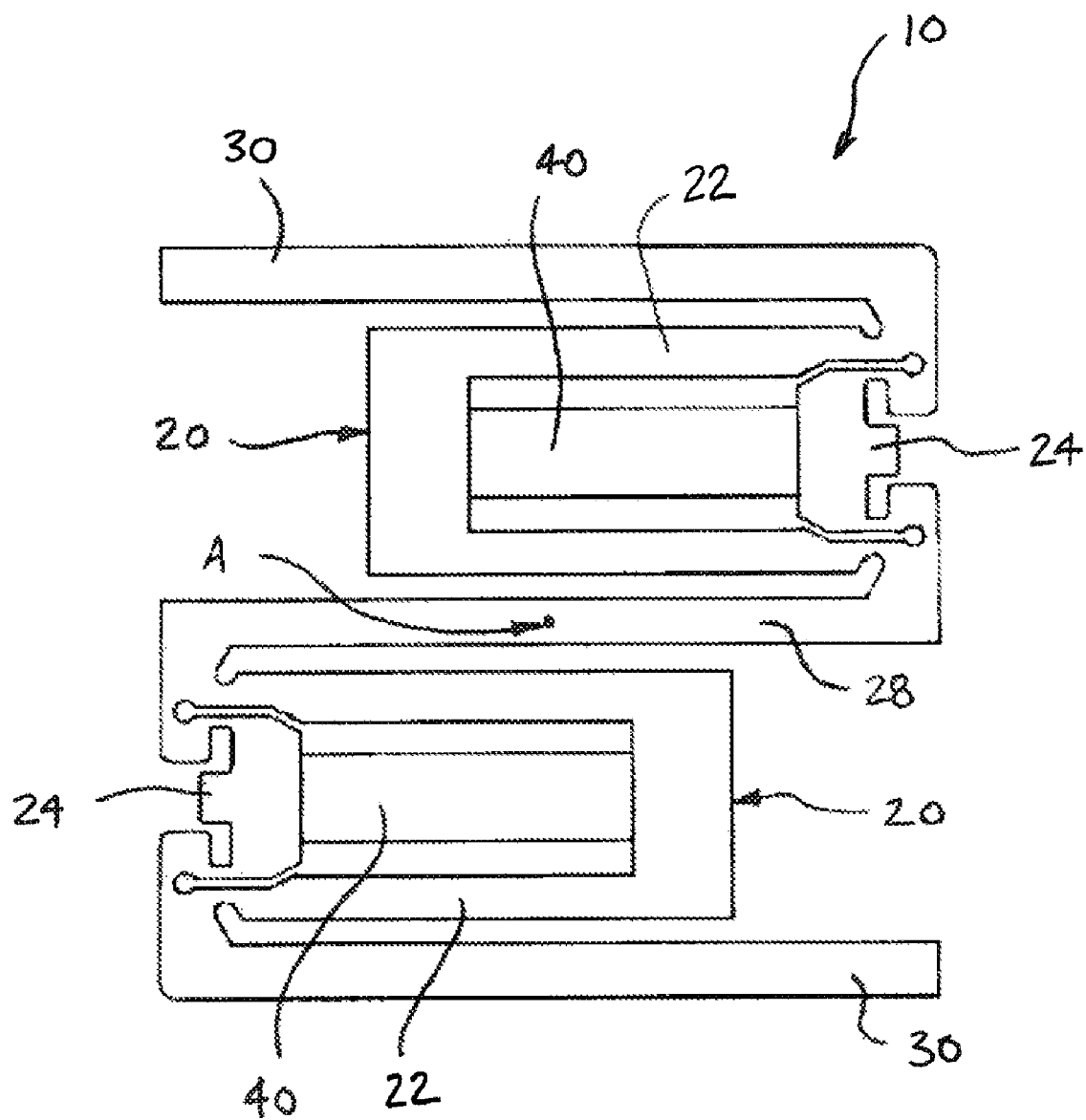
FIG. 4 is a front view of another embodiment of the piezo transducer of the present invention.
Figure 5:
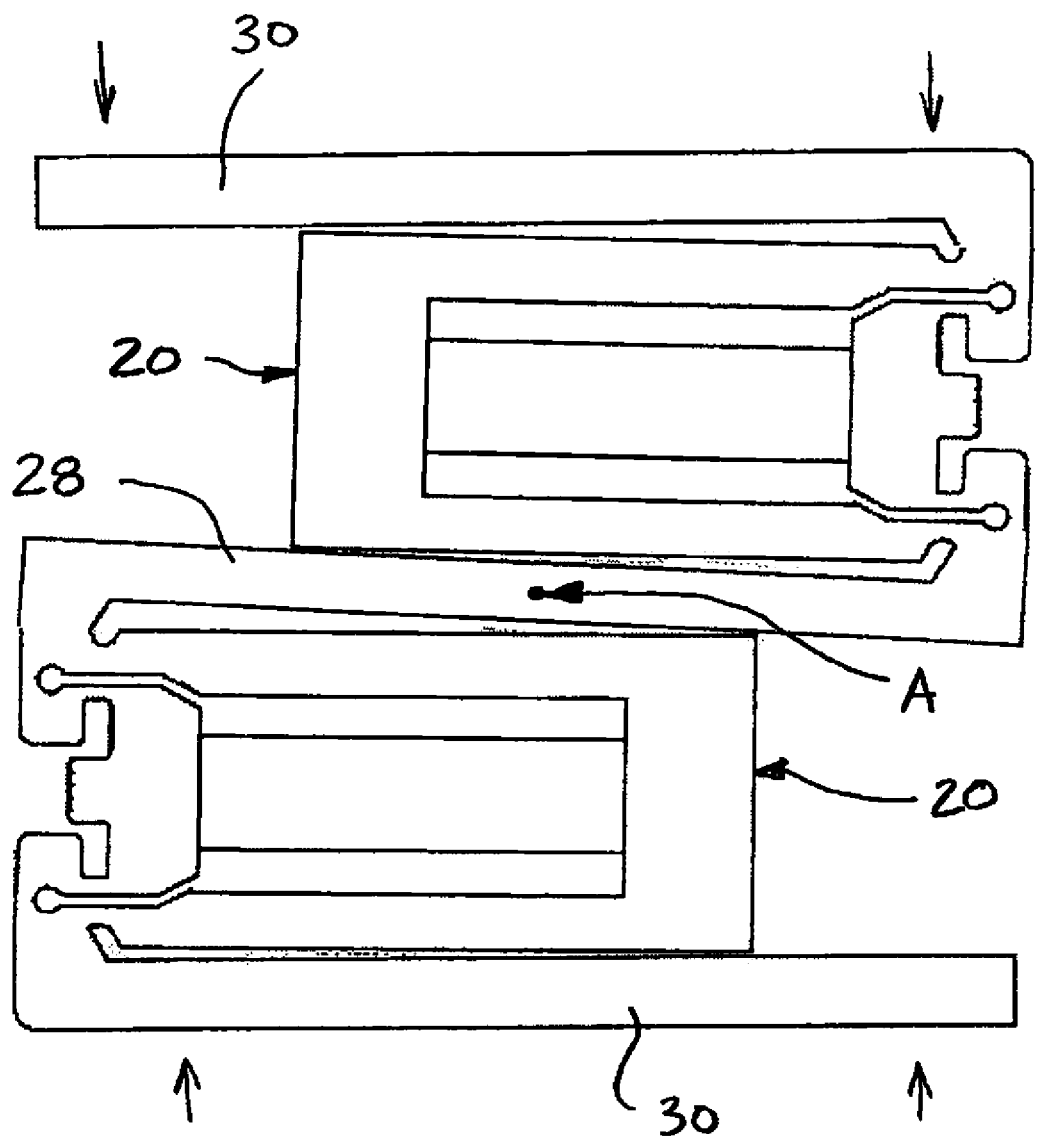
FIG. 5 is a front view of the piezo transducer of FIG. 4 shown in an actuated state.

Referring now to FIG. 4, another embodiment of the transducer mechanism 10 of the present invention is shown. Transducer mechanism 10 comprises at least two supports 20 connected by an intermediate arm 28, each support 20 including a rigid non-flexing portion 22, an arm portion 30 extending from the rigid portion, a force transfer member 24 operably positioned for moving the arm portion 30, an actuator 40 operably engaged between the rigid portion 22 and the force transfer member 24 to drive the force transfer member 24 relative to the rigid portion 22 to move the arm portion 30 in response to an electrical activation of the actuator 40. As shown the arms 30 are generally parallel to each other and remain generally parallel to each other when the actuators are electrically activated as shown in FIG. 5 wherein the mechanism 10 is supported at point A which is the midpoint of the intermediate arm 28.

Figure 6:
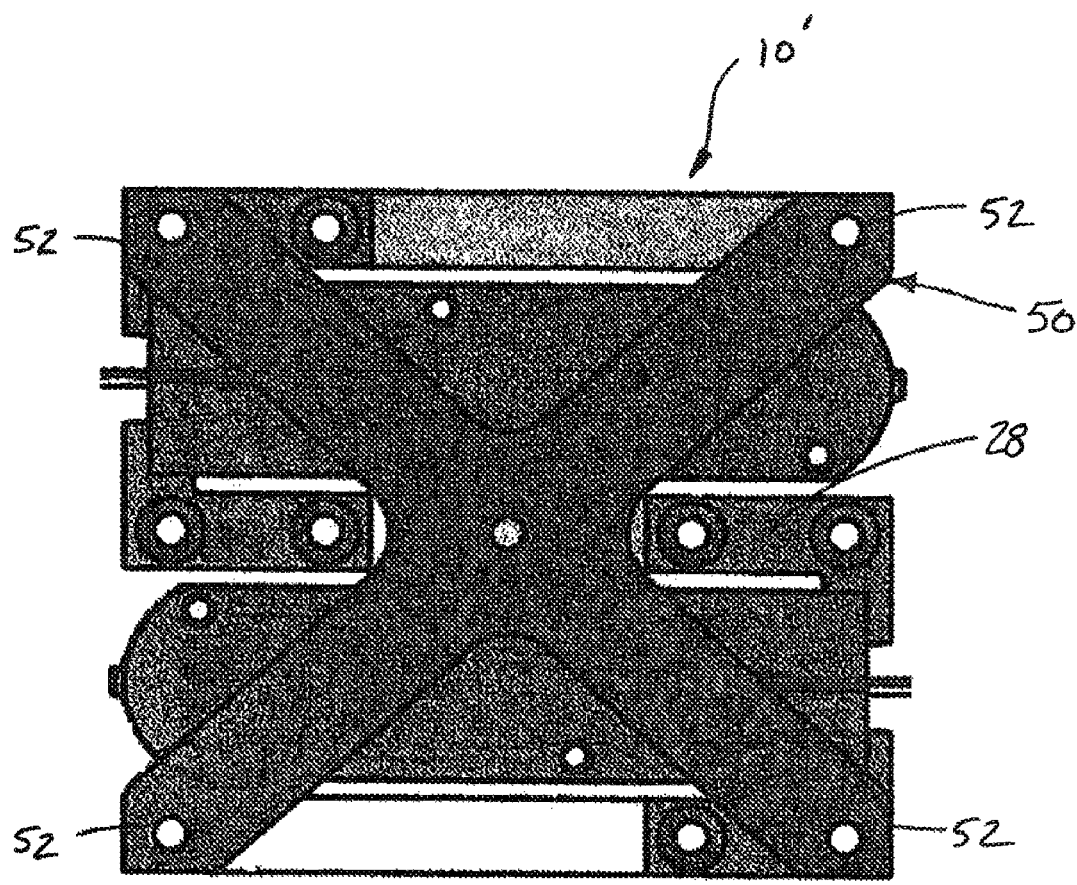
FIG. 6 is a perspective view of another embodiment of the piezo transducer of the present invention.
Figure 7:
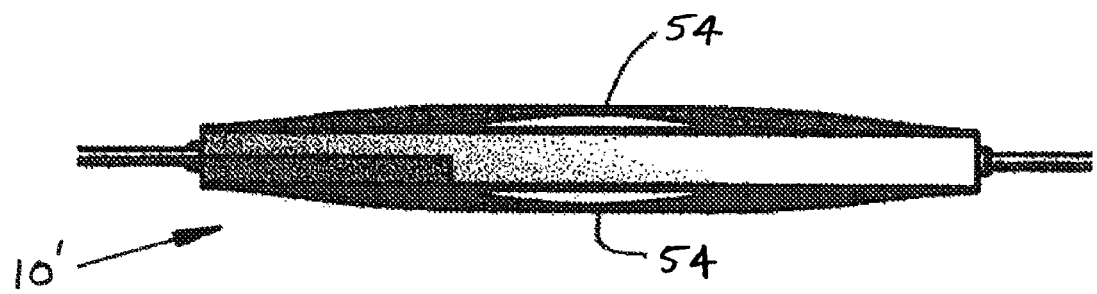
FIG. 7 is a top view of the piezo transducer of FIG. 6 shown in an actuated state.

Referring now to FIG. 6, another embodiment of the transducer mechanism 10' of the present invention is shown. Mechanism 10' is similar to that of mechanism 10. One difference is that flexible member 50 has been added. Although not limited as such, flexible member 50 is shown in an X configuration with the ends 52 of the member 50 attached to the arms 30. When the actuators are electrically activated the arms 30 move toward each other, this movement shortens the attachment length of the flexible member 50 causing a portion 54 of the flexible member 50 to bow in a direction perpendicular to the driving direction of the actuator 10' as shown in FIG. 7.

The flexible member 50 may be a flat stock spring steel of an appropriate thickness. The flexible member 50 may be positioned on both sides of the transducer mechanism 10' to provide additional amplification. When the transducer mechanism 10 is supported at the intermediate arm 28, the devices mechanically balanced in all directions. This should reduce noise as all forces are equally and oppositely opposed. The flexible member 50 is not limited to any particular material. For example, it is contemplated that a rubber diaphragm material may also be used in particular applications.

The amplification provided by the transducer mechanisms 10', 110 of the present invention can generally provide a stroke that is 20 to 30 times the movement of the actuator 40, 140.

The supports 20, 120 may be formed as a unitary, integral, single-piece monolithic body or other suitable construction. In the embodiments shown, each actuator 40, 140 is a piezoelectric device.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A transducer mechanism comprising:
  a first support structure defining a first rigid non-flexing portion, a moveable first force transfer member, and a first smart material actuator positioned between the first rigid non-flexing portion and the first force transfer portion, and a first arm and a second arm;
  the first smart material actuator operable to move the first force transfer member in a manner moving the first and second movable arms with respect to the first rigid non-flexing portion;
  a second support structure defining a second rigid non-flexing portion, a moveable second force transfer member, a second smart material actuator positioned between the first rigid non-flexing portion and the second force transfer portion, a third moveable arm, and the second moveable arm shared with and connecting the second support structure with the first support structure;
  the second smart material actuator operable to move the second force transfer member in a manner moving the second and third movable arms with respect to the second rigid non-flexing portion;
  wherein the first and second actuator are operable to cause the first and third arms to move toward or away from each other in a generally parallel manner.

2. The transducer mechanism of claim 1 further comprising a flexible member having a first portion attached to the first arm and a second portion, distal to the first portion, attached to the third arm;
  a portion of the flexible member moving perpendicular to a driving direction of the actuator when the actuator is electrically activated.

3. The transducer mechanism of claim 1, wherein the at least two supports are formed as a single piece.

4. The transducer mechanism of claim 1, wherein the transducer is supported at a midpoint of the second arm.

5. The transducer mechanism of claim 4, wherein the second arm rotates about the midpoint of the second arm when the actuators are electrically activated.

6. The transducer mechanism of claim 1, wherein each actuator is a piezoelectric device.

7. A transducer mechanism comprising:
  at least two supports connected to each other by an intermediate arm, each support including:
    a rigid non-flexing portion,
    an arm portion extending from the rigid portion;
    a force transfer member operably positioned for moving the arm portion;
    an actuator operably engaged between the rigid portion and the force transfer member to drive the force transfer member relative to the rigid portion to move the arm portion in response to an electrical activation of the actuator;
  wherein the arms of each support are generally parallel to each other and remain generally parallel to each other when the actuators are electrically activated.

8. The transducer mechanism of claim 7 further comprising a flexible member having a first portion attached to the arm portion of a first support of the at least two supports and a second portion, distal to the first portion, attached to the arm portion of a second of the at least two supports;

a portion of the flexible member moving perpendicular to the driving axis of the actuators when the actuators are electrically activated.

9. The transducer mechanism of claim 7, wherein the at least two supports are formed as a single piece.

10. The transducer mechanism of claim 7, wherein each actuator is a piezoelectric device.

11. A transducer mechanism comprising:

a first and second support structure connected to each other by an intermediate arm;

the first support structure defining a first rigid non-flexing portion, a moveable first force transfer member, and a first smart material actuator positioned between the first rigid non-flexing portion and the first force transfer portion, and a first arm;

the first smart material actuator operable to move the first force transfer member in a manner moving the first arm and the intermediate arm with respect to the first rigid non-flexing portion;

a second support structure defining a second rigid non-flexing portion, a moveable second force transfer member, a second smart material actuator positioned between the first rigid non-flexing portion and the second force transfer portion, and a second moveable arm;

the second smart material actuator operable to move the second force transfer member in a manner moving the second arm and the intermediate arm with respect to the second rigid non-flexing portion;

wherein the first and second actuator are operable to cause the first and second arms to move toward or away from each other in a generally parallel manner; and wherein the mechanism is supported generally at a midpoint of the intermediate arm.

12. The transducer mechanism of claim 11 further comprising a flexible member having a first portion attached to the first arm and a second portion, distal to the first portion, attached to the second arm;

a portion of the flexible member moving perpendicular to a driving axis of the actuators when the actuators are electrically activated.

13. The transducer mechanism of claim 11, wherein the at least two supports are formed as a single piece.

14. The transducer mechanism of claim 11, wherein each actuator is a piezoelectric device.

15. The transducer mechanism of claim 11 wherein the intermediate arm rotates about the midpoint of the intermediate arm when the actuators are electrically activated.

\* \* \* \* \*